March 4, 1924. 1,485,987

A. H. MANWARING

HYDRAULIC CLUTCH

Filed Dec. 23, 1920   3 Sheets-Sheet 1

March 4, 1924.
A. H. MANWARING
HYDRAULIC CLUTCH
Filed Dec. 23, 1920
1,485,987
3 Sheets-Sheet 2
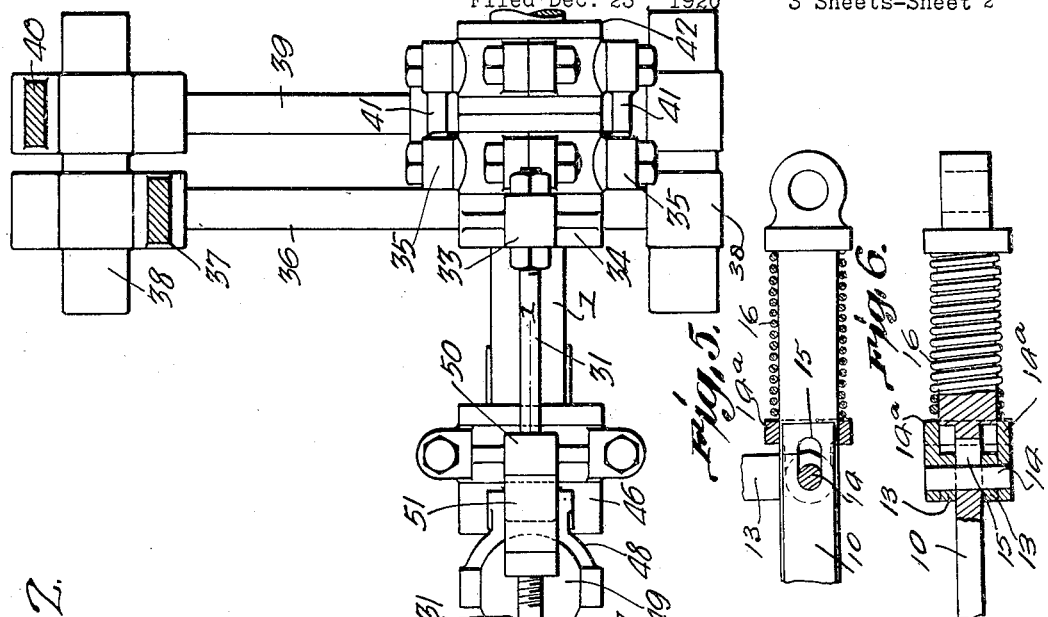
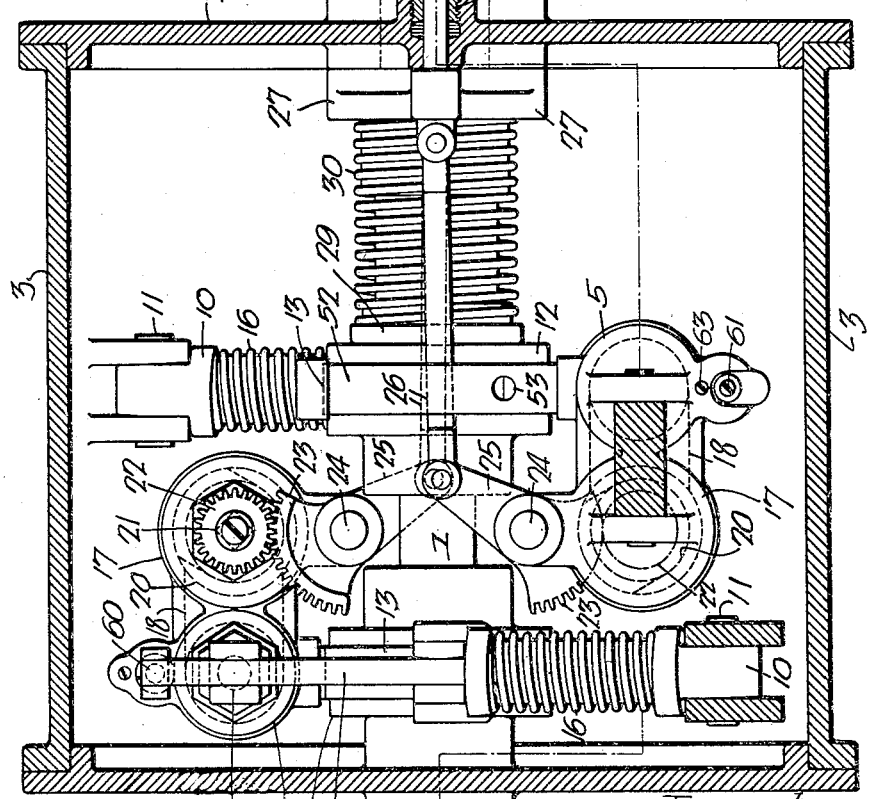
Inventor
Albert H. Manwaring.
by his Attorneys
Howson & Howson March 4, 1924.

A. H. MANWARING

HYDRAULIC CLUTCH

Filed Dec. 23, 1920

Inventor:—
Albert H Manwaring
by his Attorneys:—
Howson + Howson

Patented Mar. 4, 1924.

1,485,987

UNITED STATES PATENT OFFICE.

ALBERT H. MANWARING, OF NOBLE, PENNSYLVANIA, ASSIGNOR OF ONE-HALF TO ROY A. MANWARING, OF NOBLE, PENNSYLVANIA.

HYDRAULIC CLUTCH.

Application filed December 23, 1920. Serial No. 432,748.

*To all whom it may concern:*

Be it known that I, ALBERT H. MANWARING, a citizen of the United States, residing in Noble, Montgomery County, Pennsylvania, have invented Hydraulic Clutches, of which the following is a specification.

One object of this invention is to provide a device for operatively connecting or transmitting power between a driving member or source of power and a power receptive device or driven member,—which shall include a novel arrangement of cylinders, pistons and controlling valve mechanism; the invention especially contemplating novel means for replacing liquid escaping from the cylinders or other part of the apparatus, as well as means for automatically permitting escape of surplus liquid under predetermined conditions.

I further desire to provide novel means for taking up the shock or stress occurring when the device is put into operation, together with means for maintaining the driven member at a predetermined speed, regardless of variations in the speed of the driving member.

Another object of the invention is to provide a relatively simple and substantial hydraulic device for operatively connecting a source of power whose speed may vary, with a shaft or other power receptive device whose speed must be maintained constant, together with suitable controlling means for governing its starting and stopping and an automatic device for maintaining the power receptive device at a predetermined constant speed under operating conditions.

These objects and other advantageous ends I attain as hereinafter set forth, reference being had to the accompanying drawings, in which, Fig. 1 is a longitudinal vertical section of a hydraulic clutch embodying my invention;

Fig. 2 is a longitudinal section on the line 2—2, Fig. 1;

Figs. 5 and 6 are a side elevation and a plan, both partly in section, showing the construction of certain details of my invention.

Figure 1:
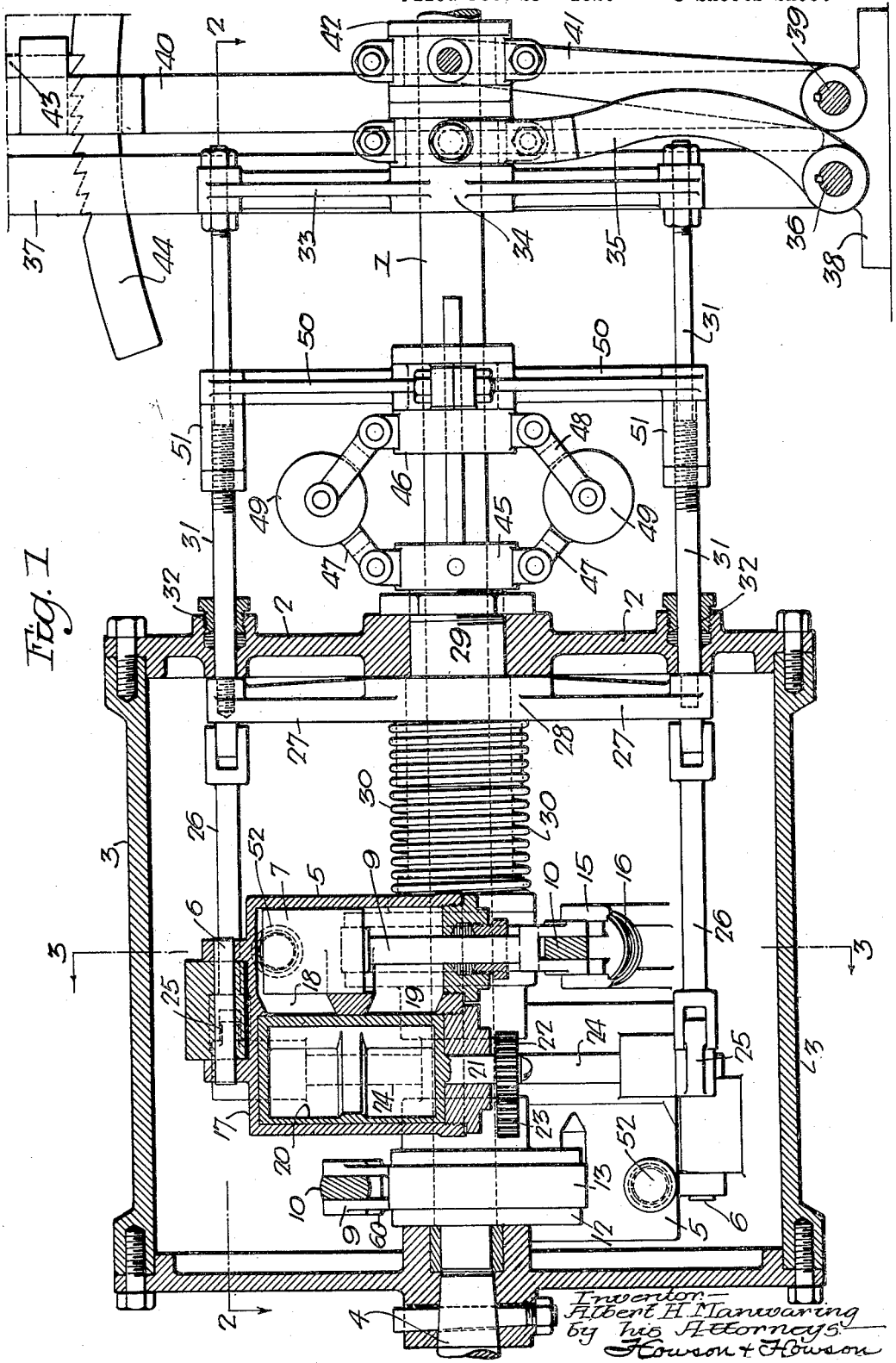
Figure 3:
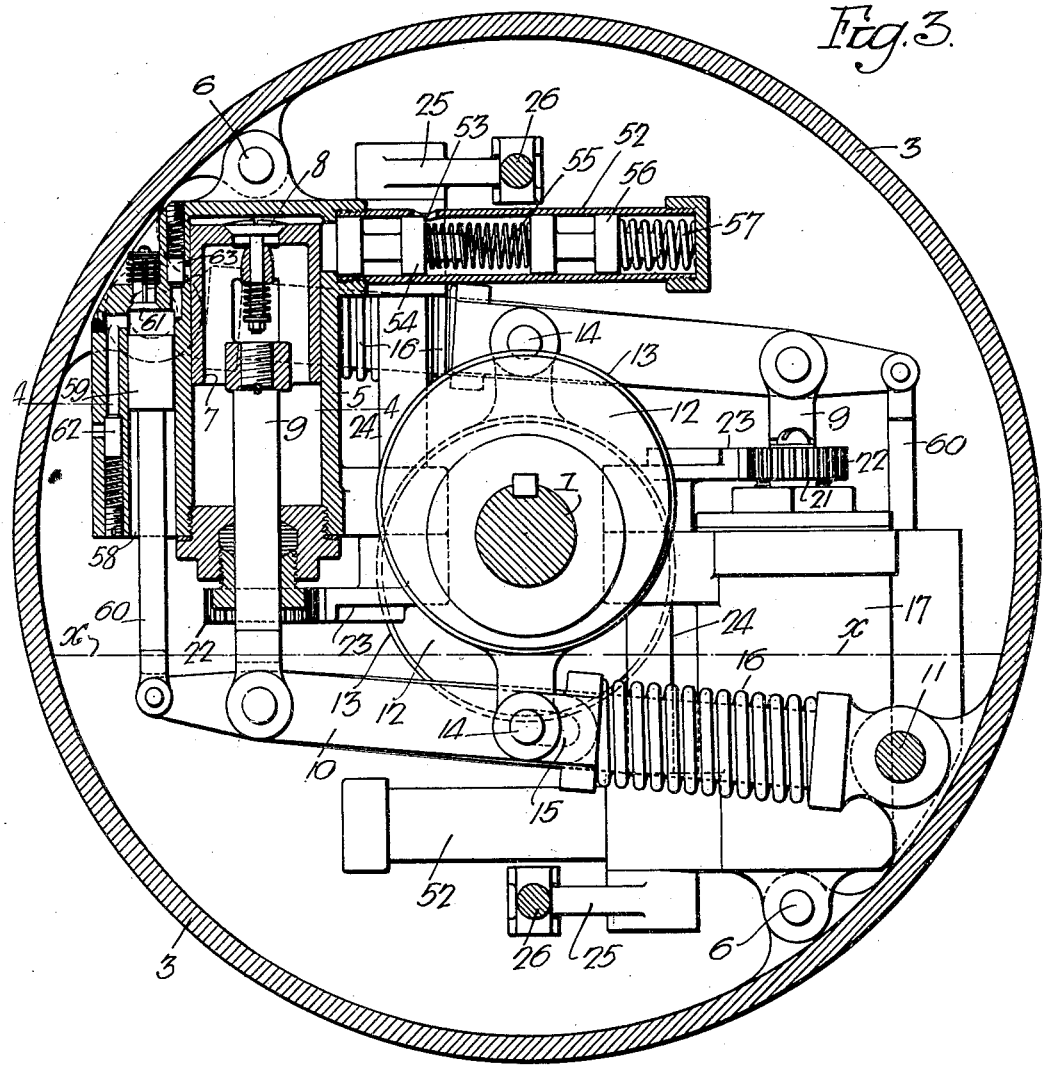
Fig. 3 is a transverse vertical section on the line 3—3, Fig. 1.
Figure 4:
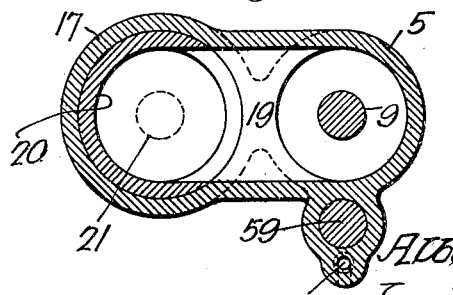
Fig. 4 is a transverse section on the line 4—4, Fig. 3.

In Figs. 1 to 4 of the above drawings, 1 represents a shaft connected to any device to be driven and projecting into the removable end 2 of a casing structure 3 keyed or otherwise fixed to a shaft 4 driven from an engine, motor or other suitable source of power. Within the casing 3 are mounted any desired number of cylinders 5 pivotally connected or hinged by bolts or pins 6 to the wall of the casing, so that, as shown in Fig. 3, their longitudinal axes extend to one side of and at right angles to the line of the shafts 1 and 4.

Each of these cylinders has mounted in it a piston 7 provided with a poppet or other form of one way valve 8 positioned to permit passage of liquid through it in one direction, and each of said pistons has connected to it a rod 9 passing out of that end of the cylinder distant from the pivot 6 and pivotally connected to a lever arm 10 adjacent one end thereof. Each of said arms extends substantially at right angles to the rod 9 and its opposite end is pivotally connected or hinged to the wall of the casing 3 by a bolt or pin 11.

Each of the units constituted by a cylinder 5, piston 7 and lever 10 is designed to be actuated by an eccentric 12 keyed or otherwise fixed to the shaft 1 and provided with a strap 13 connected to said lever by a pin 14 operative in a slot 15 thereof and extending through a plate 14ª slidable on said lever, there being a spring 16 mounted on the lever arm between said plate and the pin 11 in position to provide a yieldable connection between said strap and lever. The parts are so arranged that as the shaft 1 is rotated, the eccentric 12 imparts an oscillatory motion to the lever 10 and causes reciprocation of the piston 7 within the cylinder 5.

Each of the cylinders 5 has mounted upon or immediately adjacent it a valve chest box 17 with which its opposite ends are connected through relatively large ports 18 and 19 (Fig. 1) and said valve chest or box contains a rotary valve 20 in the form of a substantially semi-cylindrical shell closed at the ends and mounted on a spindle 21. This latter outside of the valve casing has fixed to it a gear 22 meshing with a toothed segment 23 fixed to a spindle 24. One end of this spindle has a projecting arm 25 which through a link 26 is connected to an arm 27 integral with or operatively connected to a sleeve 28 slidably mounted upon a second sleeve 29 on the shaft 1.

In the present instance I have shown two of the liquid-clutch units comprised by a cylinder with its associated parts and its actuating eccentric, etc., and these are so disposed within the casing as to balance each other. There are therefore two of the arms 27 projecting in opposite directions from the sleeve 28 and between the latter and the nearest one of the eccentrics 12 is confined a spring 30 normally holding the arms as near as possible to the removable casing head 2. The outer end of each of said arms has connected to it rods extending through suitable stuffing boxes 32 in the head 2 and at their outer ends connected to a pair of arms 33, in the present instance formed integral with a sleeve 34 slidable on the shaft 1. The latter is engaged by the forked end of an arm 35 fixed to a suitably supported shaft 36 to which is also fixed an operating lever 37.

Also mounted on the base or other fixed structure 38 providing bearings for the shaft 36, is a second shaft 39 having fixed to it a second operating lever 40 and a forked arm 41 operatively engaging a second sleeve 42 slidable on the shaft 1 on the outer side of the sleeve 34, and this second lever 40 is provided with a hand controlled pawl 43 cooperating with a notched quadrant 44 to retain said lever and its associated parts in definite positions against a force tending to move them away from the casing 3 as hereafter explained.

Mounted on the shaft 1, outside of but preferably adjacent the head 2 of the casing 3, is a centrifugal governing device consisting of a collar 45 shown as mounted on and pinned to the shaft 1. The second sleeve 46 is splined to but slidable longitudinally of the shaft 1 and is connected to the fixed sleeve 45 by two pairs of links 47—48 respectively carrying balls or other suitable forms of oppositely disposed weights 49 so arranged that when the shaft 1 is rotated they tend to move outwardly under the action of centrifugal force and slide the sleeve 46 along said shaft toward the sleeve 45. The former of these sleeves is formed with an annular recess in which is rotatably mounted a split hub having a pair of oppositely projecting arms 50 through whose outer ends the rods 31 slidably extend, and each of said rods has adjacent its arm 50 a shoulder or abutment member 51 preferably adjustably mounted, so that under certain conditions it is engaged by its arm and transmits movement to the rod 31 by which it is carried.

Each of the cylinders 5 has connected to it at or adjacent one end a hollow or tubular casing 52 having an outlet opening 53 normally cut off from said cylinder by a piston or other suitable valve 54 normally held from moving within said casing away from the cylinder by a spring 55. Owing to the variations in the amount of liquid in the end of the cylinder to which the casing 52 is connected, the valve 54 acts as a breather by sliding longitudinally of said tube to accommodate varying quantities of liquid delivered to said cylinder, without however normally uncovering the port 33.

In order to provide for abnormal conditions which would require a safety valve to permit of the escape of some of the liquid from the cylinder, I provide a second member 56 also slidable in the casing 52 and held against the outer end of the spring 55 by a second and more powerful spring 57. The parts are so arranged and proportioned that on the occurrence of an abnormal and possibly injurious pressure in the cylinder, the valve 54 acts directly on the member 56, and by causing compression of the spring 57, moves sufficiently far into the casing 52 to uncover the port 53, thereby permitting the escape of liquid into the body of the main casing 3.

In order to maintain a constant supply of liquid to the cylinders 5, I equip each of them with a pump including in the present instance an auxiliary cylinder 58 integral with or immediately adjacent it and containing a piston 59 connected through a rod 60 to an extension of the eccentric rod 10. Each auxiliary cylinder has also an intake valve 61, an excess pressure or safety valve 62 and a check valve 63 controlling the passage of liquid through a suitable port to the adjacent main cylinder 5.

As shown in the drawing, the parts are in the positions occupied when the shaft 1 is operatively coupled to the driving shaft 4, since as will be noted from Fig. 2, the valves 20 are closed and cut off communication between the opposite ends of each of the cylinders 5 which are full of liquid. There therefore can be no movement of the pistons 7 within said cylinders, so that the parts of the apparatus are clutched together and power is transmitted from the driving shaft 4 through the casing 3, cylinders 5, pistons 7, rods 9, lever arms 10 and eccentrics 12 to the driven shaft 1. The latter as a consequence is turned at the same speed as the driving shaft, and if at any time it be desired to disconnect said shafts, this may be accomplished by moving the lever 37 toward the casing. As a result of such movement, the rods 31 are moved into the casing against the action of the spring 30 and through the links 26, segments 23 and gears 22, the valves 20 are turned sufficiently to permit of a free communication between the two ends of each cylinder 5. Thereupon the pistons are free to reciprocate in said cylinders and the casing 3 with its attached parts continues to rotate without transmitting movement to the shaft 1.

If it be desired that the shaft 1 shall run at some speed less than that of the shaft 4, the lever 40 is moved toward the casing and retained by a notched quadrant or otherwise held in a definite position in which each of the valves 20 is more or less closed so as to interfere to a greater or less extent with the free flow of liquid into and out of each of the cylinders 5. As a consequence, while the shaft 1 will be turned, its speed is less than that of the driving shaft 4 by an amount dependent upon the position of the lever 33 and of the valves 20. Obviously by adjusting the abutments 51, the governor mechanism may be so set that when the speed of the shaft 1 exceeds a predetermined number of revolutions per minute, the weights 49 will fly out sufficiently to cause the arms 50 to engage said abutments, and through the rods 31 and links 26, so move the valves 20 as to permit the flow of sufficient liquid to and from the ends of the cylinders to maintain the speed of the shaft 1 at the point desired.

From the above description it will be noted that I can quickly and conveniently cut off power from the driven shaft at will or can so adjust the parts that the latter will be operated at any desired speed as determined by the position of the controlling lever 40. Moreover by properly adjusting the governor mechanism, I can cause the speed of the driven shaft to be automatically maintained at any given amount.

Without departing from my invention the governor mechanism may be omitted and the device controlled solely by the levers 37 and 40, it being understood that I may employ any desired number of power transmitting units between the driving and driven members.

While the apparatus above described may be advantageously used for controlling the speed of a shaft driven from any suitable source of power, it is to be noted that it is particularly useful when connected between the engine and the driven shaft of a motor vehicle. When so used, the governor limits the maximum speed of the vehicle and so operates that the motor or engine thereof is free to speed up when extra power is required, as for example when the vehicle is ascending hills, etc.

Again, my invention is peculiarly adapted for use between the source of power of a vessel and its propeller, especially in large size units, for the governor acts as a safety device when the apparatus races due to the propeller being temporarily out of water. Under these conditions the valves of my clutch mechanism are immediately opened by said governor, thereby causing or permitting the clutch members to slip relatively to each other so that when the propeller is again immersed in the water, there is no abnormal stress on the propeller shaft, but under the action of the governor the clutch gradually again assumes the load until the full power of the source is again transmitted to the propeller.

I claim:

1. The combination of driving and driven members; a fluid clutch operatively connecting said members; a governor operative on said clutch and responsive to the speed of the driven member for maintaining such speed constant; means independent of the governor for adjusting the clutch to maintain a definite difference in speed between the driving and driven members; and a device for throwing the clutch into and out of operation independently both of said adjusting means and of the governor.

2. The combination of driving and driven members; a fluid clutch operatively connecting said members; a governor operative on said clutch and responsive to the speed of the driven member for maintaining such speed constant; means including an operating lever and a holding device therefor for setting the clutch to maintain a predetermined difference in speed between the driving and driven members independently of the governor; and means including a second controlling lever connected to release said clutch at will.

3. The combination of driving and driven members; an eccentric actuated from one of said members; a cylinder connected to the other member; a piston for said cylinder actuated by said eccentric; and valve mechanism controlling the flow of fluid under the action of said piston, with a pump also actuated by the eccentric for supplying fluid to the cylinder.

4. The combination of driving and driven members; an eccentric actuated from one of said members; a casing connected to the other member; a cylinder connected to the casing; a piston in said cylinder; a lever actuated by said eccentric fulcrumed on the casing and connected to the piston; with valve mechanism controlling the flow of fluid under the action of said piston between the opposite ends of said cylinder.

5. The combination of a driving and a driven member; a cylinder, a piston and an eccentric actuating the piston all connected to transmit power between the driving and driven members; and a resilient connection between the eccentric and the piston.

6. The combination of a driving and a driven member; means for transmitting power between said members including a cylinder, a piston therein, an eccentric, and means including a strap connecting the eccentric with the piston; with a spring mounted to permit limited movement of the eccentric strap relative to the means connecting it with the piston.

7. The combination of a driving and a driven member; an eccentric on one of said members; a strap for said eccentric; at least one spring normally maintaining said eccentric strap in a definite position; means including a cylinder and piston for connecting the eccentric strap with the other of said members; and means for controlling the flow of fluid acted on by the piston to and from the cylinder.

8. The combination of a driving and a driven member; means for operatively connecting said members including a cylinder, a piston and a device for causing reciprocation of the piston in the cylinder; means for controlling the flow of fluid under the action of the piston; a casing connected to said cylinder; and a spring pressed member in said casing for permitting variation of its volume, there being a port in the casing positioned to permit of the escape of fluid therefrom when said spring pressed member moves to a predetermined extent.

9. The combination of a driving and a driven member; means for operatively connecting said members including a cylinder, a piston operative therein, and means for controlling the flow of fluid acted on by said piston; a casing connected to the cylinder having an outlet port; a spring actuated valve member normally movable in the casing to accommodate variations in the quantity of fluid delivered to the cylinder without uncovering said port; and an element yieldable to permit an abnormal movement of said valve member sufficient to open the port.

10. The combination of a driving and a driven member; means for operatively connecting said members including a cylinder and a piston operative therein; and means controlling the flow of fluid toward and from the cylinder under the action of the piston; the same including a valve casing connected to the cylinder and having a port therein; a valve in said casing; a spring normally holding the valve in position to close the port; and a yieldably supported member movable under the action of the valve to permit opening of said port.

11. The combination of a driving and a driven member; means for operatively connecting said members including a cylinder and a piston operative therein; valve mechanism for controlling the flow of fluid acted on by the piston; a lever operatively connected to the piston with a pump operated by said lever to supply fluid to the cylinder.

12. The combination of a driving and a driven member; a casing connected to one of said members; a cylinder within the casing; a piston operative in the cylinder, a lever fulcrumed in the casing connected to the other member and to said piston; a valve mechanism controlling the flow of fluid toward and from the cylinder; and a pump for delivering fluid from the casing to the cylinder.

13. The combination of a driving and a driven member; a casing connected to one of said members; an eccentric connected to the other member; a strap for the eccentric; an arm pivoted to the casing and connected to the eccentric strap; a cylinder and piston operatively connected between the arm and the casing; and valve mechanism controlling the flow of fluid acted on by the piston when the latter is reciprocated by the eccentric.

14. The combination of a driving and a driven member; a casing connected to one of said members; an eccentric connected to the other member; a strap for the eccentric; an arm pivoted to the casing and connected to the eccentric strap; a cylinder and a piston operatively connected between the arm and the casing; valve mechanism controlling the flow of fluid under the action of the piston when the latter is reciprocated by the eccentric; and a spring permitting limited relative movement of the eccentric strap and said arm.

ALBERT H. MANWARING.